Oct. 25, 1966     T. H. HOLMES ETAL     3,280,673
TOOL POST
Filed Aug. 20, 1964     2 Sheets-Sheet 1
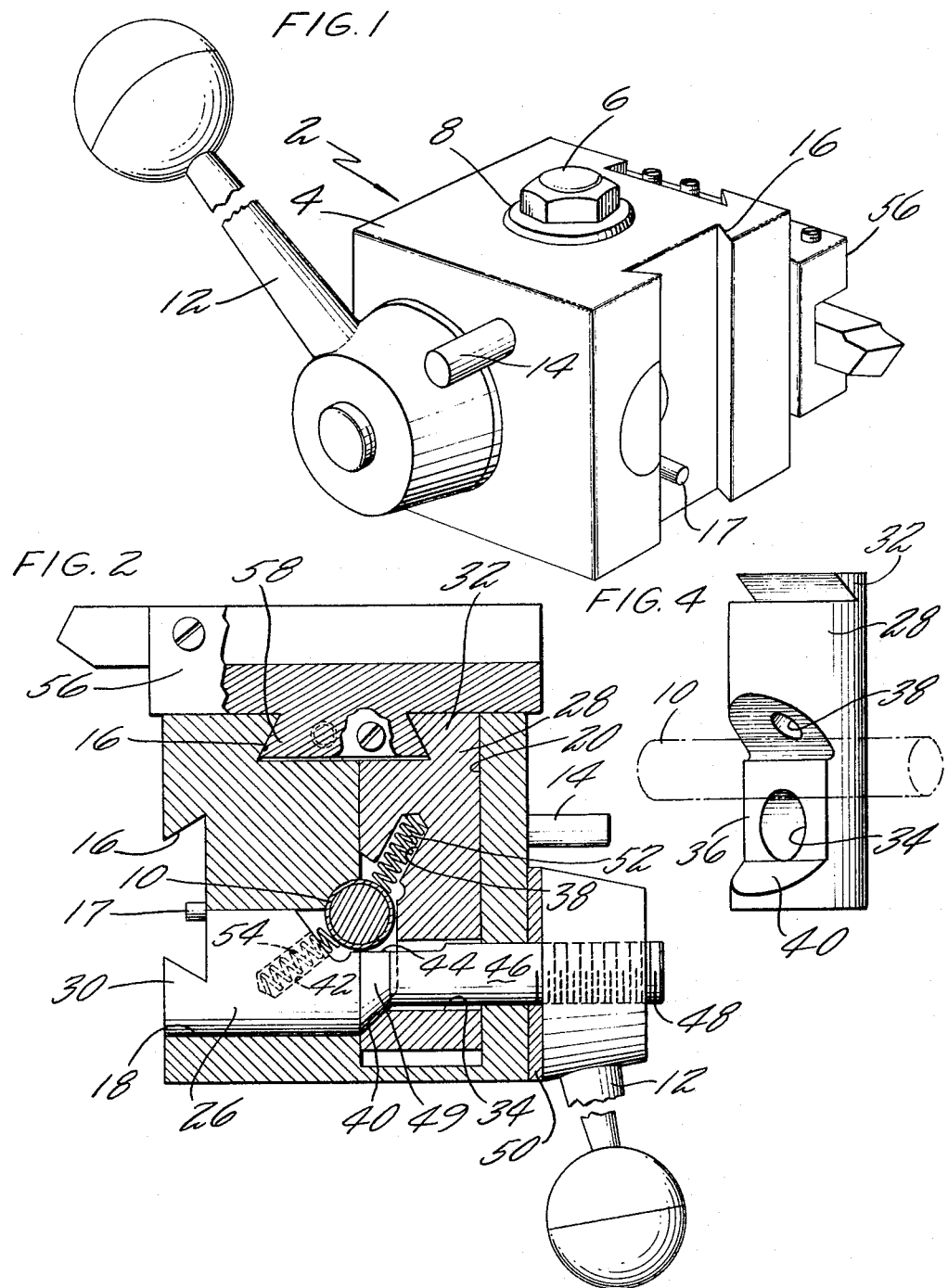
INVENTORS
TRENT H. HOLMES
CHARLES A. GLENN
BY David S. Fishman
ATTORNEY Oct. 25, 1966  T. H. HOLMES ETAL  3,280,673
TOOL POST
Filed Aug. 20, 1964  2 Sheets-Sheet 2
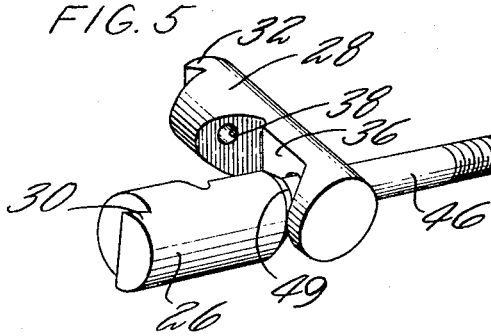
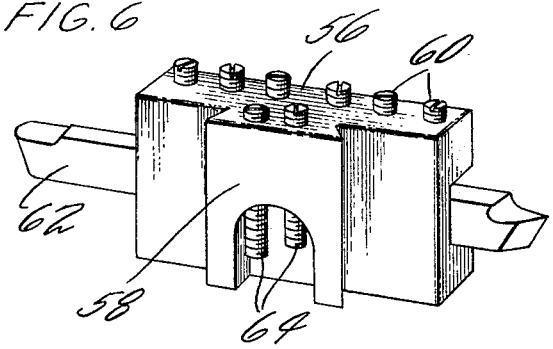
INVENTORS
TRENT H. HOLMES
CHARLES A. GLENN
BY David S. Fichman
ATTORNEY

United States Patent Office 3,280,673
Patented Oct. 25, 1966

3,280,673
TOOL POST
Trent H. Holmes, 100 Bailey Road, Rocky Hill, Conn., and Charles A. Glenn, 92 Four Mile Road, West Hartford, Conn.
Filed Aug. 20, 1964, Ser. No. 390,806
15 Claims. (Cl. 82—36)

This invention relates to a new and improved tool post and tool holder. More particularly, this invention relates to a new and improved means for gripping and securing tool holders in a tool post.

In the present invention the tool post is provided with a pair of mortise dovetail slides, and each tool holder to be used in conjunction with the tool post is provided with a complementary dovetail tenon for engagement with a mortise on the tool post. A portion of each dovetail mortise of the tool post serves as a clamping mechanism, this clamping mechanism being in the form of a moveable element having two degrees of movement, i.e. being moveable linearly or axially and also being rotatable about an axis.

A handle is mounted on one side of the tool post and is directly connected to one of the moveable elements which in turn is in actuating engagement with the other moveable element. Movement of the handle results in simultaneous actuation of both moveable elements.

When the dovetail tenon of a tool holder is placed in a mortise slide of the tool post and the handle is actuated, a heretofore unattainable extremely high and well distributed clamping force is exerted by the mortise portion of the moveable element. This high and well distributed clamping force results from the fact that the lineal movement of the moveable element pulls the tool holder to the body of the tool post while the rotational motion of the moveable element achieves and insures the broadest possible distribution of mating contact between the clamping mechanism and the tenon of the tool holder. The rotational motion of the clamping element also serves to increase mating contact between a pair of mating surfaces of the mortise and tenon.

Heretofore, any irregularity in the mating surfaces of either the clamping mechanism of a tool post or the engaged surface of the tool holder would, in effect, create a high point. The one degree of motion, i.e. just lineal motion, of previous clamping mechanism would then result in a serious lack of distribution of clamping force because only point contact would be established between the clamping mechanism and the tool holder. The two degrees of motion of the clamping mechanism of the present invention overcomes this significant deficiency of prior devices.

Accordingly, one object of the present invention is to produce a novel tool post having a more effective clamping mechanism for engagement with a tool holder than is found in previous devices.

Another object of the present invention is to produce a novel tool post wherein highly effective clamping action between the tool post and a tool holder is realized with a side mounted handle.

Still another object of the present invention is to produce a novel tool post wherein more effective distribution of clamping force between the tool post and a tool holder is realized than in previous devices.

Still another object of the present invention is to produce a novel tool post wherein broad distribution of clamping force between the tool post and a tool holder is realized with a clamping mechanism having two degrees of freedom of motion.

Other objects and advantages will be appreciated from a detailed discussion of the accompanying drawings.

In the drawings:

FIG. 1 is a perspective view of the tool post of the present invention.

FIG. 2 is a plan view of the tool holder, partly in section.

FIG. 3 is another perspective view of the tool holder.

FIG. 4 is a view of one of the moveable clamping elements of the tool post.

FIG. 5 is a view showing the engagement between the two clamping elements of the tool post.

FIG. 6 is a view of a tool holder for use with the tool post of the present invention.

Referring now to FIG. 1, the tool post 2 has a body 4 of generally cubic shape, with flat top and bottom surfaces. A bolt 6 passes through a central bore in body 4 for engagement with a block or head in the T-shaped base channel of a lathe in the manner well known in the art. A washer 8 is between the bolt head and the body to overlap the central bore. The bolt 6 is encased in a cylindrical sleeve 10 (see FIG. 2) that is located in the central bore of body 4 and which extends through body 4. Sleeve 10 is swaged at the top and bottom surfaces of body 4 to lock it in place. An actuating handle 12 is mounted on one side of body 4, and a pin 14 limits the travel of handle 12 in the disengaging direction. As can be seen in FIGS. 1–3, dovetail mortise slides 16 are machined in two perpendicularly disposed faces of tool post body 4 to receive complementary dovetail tenon portions of tool holders. Stops 17 are provided to position a tool holder in a dovetail mortise.

As can best be seen in FIGS. 2 and 3, mutually perpendicular cylindrical bores 18 and 20 are located in tool post body 4. Each bore intercepts a dovetail mortise slide, and partial circular sections, or pockets 22 and 24 corresponding to bores 18 and 20 respectively, are cut out of the intercepted mortise surfaces to provide continuations of the bores through the mortise surfaces. Bores 18 and 20 intersect internally of body 4.

A plug 26 is located in bore 18, and a plug 28 is located in bore 20, the plugs being machined from bar stock of circular cross-section so that they can both move axially and rotate in the bores. An extension 30 of plug 26 constitutes a clamping member, and a similar extension 32 of plug 28, also constitutes a clamping member. Clamping members 30 and 32 conform to the contours of partial circular pockets 22 and 24, respectively, and each of the clamping members 30 and 32 is contoured to form an integral (though moveable) part of the dovetail mortise slide that it intercepts.

The details of plug 28 are shown in FIG. 4. A bore 34 passes through plug 28 at the site of a flat portion 36 near the rear of the plug, the axis of bore 34 intersecting the axis of plug 28. Another bore 38 (also see FIG. 2) extends into plug 28. The axis of bore 38 is displaced above the axis of plug 28 so that the axis of bore 38 is skewed with respect to the axis of plug 28. That is, bore 38 is offset from the axis of plug 28. An inclined slabbed surface 40 extends from flat 36 toward the rear of plug 28.

Plug 26 has a bore 42 (shown in phantom in FIG. 2) offset from and skewed with respect to the axis of the plug similar to bore 38. A flat portion 44 leads from the body of plug 26 to a reduced diameter shank 46 having a threaded end 48. Other than along flat 44, the transition from the body of plug 26 to shank 46 is along a conical surface 49.

As seen in FIG. 2, shank 46 passes through bore 34 in plug 28, and it will be observed that the diameter of bore 34 is larger than the diameter of shank 46 by an amount at least equal to the maximum axial or rotational movement of plug 28. The base of handle 12 is threadably engaged with threaded end 48, and the base of handle 12 rotates on flat thrust washer 50. Conical surface 49 of plug 26 is in contact with slabbed surface 40 of plug 28 to transmit force to plug 28 from axial movement of plug 26.

Springs 52 and 54 extend into bores 38 and 42, respectively, from cylindrical sleeve 10. Since bores 38 and 42 are offset, spring 52 imparts a force tending to rotate plug 28 counterclockwise when looking at end 32 of the plug, and spring 54 imparts a force tending to rotate plug 26 clockwise when looking at end 30 of the plug. The engagement of plugs 26 and 28 is shown in perspective in FIG. 5. The forces of springs 52 and 54 are opening forces tending to rotate the plugs and urge them axially outward.

The tool holder 56 for use with the above described tool post is shown in FIG. 6. Tool holder 56 has a dovetail tenon 58 for engagement with a mortise slide 16 on the tool post. A row of set screws 60 is provided for locking a cutting tool 62 in place in tool holder 56: a pair of positioning screws 64 is provided for selecting the height of holder 56 when positioned in a mortise slide on the tool post, one of the screws 64 contacting a pin 17 depending on the mortise slide in which the holder is positioned.

In the operation of this invention the handle 12 is stopped against pin 14 when the tool post is in the disengaged position, and the mortise slides are presumed to be open, i.e. no tool holder is engaged in a mortise slide. The off center springs 52 and 54 rotate plugs 28 and 26 counterclockwise and clockwise, respectively, as described above. Since plugs 26 and 28 are capable of rotational motion as well as lineal, plug 26 and clamping member 30 and plug 28 and clamping member 32 might rotate into their respective mortise slide openings and thus block entry of a tool holder tenon 58 unless restrained. However, the biasing rotation imparted to plugs 26 and 28 avoids this problem by keeping the top parts of clamping members 30 and 32 rotated out of the mortise slide openings. Thus, the mortise slide openings are unobstructed and are ready to receive the tenon of a tool holder.

A tool holder 56 is positioned on the tool post by sliding the tool holder tenon 58 in a mortise slide 16 as shown in FIG. 2, a screw 64 contacting pin 17 to limit the travel of the tool holder. Handle 12 is then rotated away from pin 14 to draw shank 46 into the base of handle 12 through the interaction of the threaded connection between the end of shank 46 and the base of handle 12. Plug 26 and clamping member 30 are thus drawn lineally or axially inwardly of body 4. The wedging action between conical surface 49 and inclined surface 40 then causes plug 28 and clamping member 32 to be drawn lineally or axially inwardly of body 4. When clamping member 32 initially grips the tenon 58 of the tool holder it then is caused to rotate against the opening force of spring 52 to apply distributed gripping contact to the tenon and also force the tenon into the pocket of mortise slide 16 opposite to the side on which clamping member 32 is located. Of course, if holder 56 had been placed in the mortise slide containing clamping member 30, clamping member 30 would have been caused to translate and rotate in the manner described above for member 32. The flat surfaces 36 and 44 are spaced a short distance from sleeve 10 when perpendicular to radii of the sleeve. Thus any excessive rotation of either plug is avoided since the flats will contact sleeve 10 before excessive rotation can occur.

The combined translation and rotation of the plugs and clamping members provides a better distribution of clamping or gripping forces than heretofore attainable. Also, the cooperative connection between plugs 26 and 28 internally of body 4 achieves the highly desirable result of having two clamping elements operable from a single side mounted handle.

When handle 12 is returned to the disengaged position, the springs 52 and 54 impart forces to the plugs to remove the clamping load from the tool holder and return the plugs to the open condition.

It will be understood that, if desired, the dovetail parts could be reversed so that the tenon would be part of the body of the tool post and the mortise slide part of the tool holder. In that event, the clamping members would then form part of the tenons.

It is to be understood that the invention is not limited to the particular preferred embodiment herein disclosed and described, but can be practised in other ways within the spirit as defined by the following claims.

We claim:
1. In a tool post;
   means for receiving a tool holder;
   a bore in said tool post intersecting said receiving means;
   a plug in said bore;
   clamping means at one end of said plug, said clamping means forming part of said receiving means, said plug being movable along the axis of said bore and being free to rotate about the axis of the bore within predetermined limits to provide two degrees of freedom of motion to said clamping means; and
   means for imparting axial and rotational motion to said plug to apply distributed gripping contact between said clamping means and a tool holder in said receiving means.

2. A tool post as in claim 1 including biasing means connected to said plug for imparting a rotational force to said plug to rotatably bias the position of said clamping means when said receiving means has not received a tool holder to prevent said clamping means from blocking entry into said receiving means.

3. In a tool post, said tool post having a body with a pair of faces disposed at an angle to each other, means on each of said faces for receiving a tool holder, a first bore of circular cross section in said body intersecting the receiving means on one of said faces, a second bore of circular cross section intersecting the receiving means on the other of said faces, a plug housed in each of said first and second bores, each of said plugs being movable along the axis of its bore and being free to rotate about the axis of its bore within predetermined limits, clamping means on each plug, each of said clamping means forming a part of a receiving means, and means for imparting a first motion to at least one of said clamping means along the axis of the bore housing its associated plug and a second motion of rotation to said one clamping means about said axis to apply distributed gripping contact between said one clamping means and a tool holder in said receiving means.

4. A tool post as in claim 3 wherein the means for imparting rotational motion includes a tool holder positioned in the receiving means of which said one clamping means forms a part and interacting with said one clamping means.

5. A tool post as in claim 3 wherein said tool post has a body of generally cubic shape, and wherein said pair of faces are on perpendicularly disposed sides of said body, and including means on another side of said body for actuating both of said clamping means.

6. A tool post as in claim 3 including biasing means connected to each of said plugs for imparting a rotational force to each of said plugs to rotatably biasing the position of each of said clamping means when the receiving means of which each clamping means forms a part has not received a tool holder to prevent each of said clamping means from blocking entry of a tool holder into the receiving means of which it forms a part.

7. A tool post as in claim 6 wherein said biasing means includes spring means connected to each of said plugs for imparting a rotational force to each of said plugs.

8. A tool post as in claim 7 wherein each of said plugs has a bore having an axis skewed with respect to the axis of the bore housing the plug, and wherein said spring means includes a spring extending from the interior of said tool post into the bore in each plug and imparting a force along the axis of the bore in each plug.

9. A tool post as in claim 3 wherein each of said receiving means is in the shape of a dovetail member.

10. A tool post as in claim 8 wherein said dovetail member is a mortise slide.

11. In a tool post, said tool post having a body of generally cubic shape, first dovetail receiving means on one side of said body for receiving a tool holder having a mating dovetail member, second dovetail receiving means on a second side of said body perpendicular to said first side for receiving a tool holder having a mating dovetail member, a first bore in said body intersecting said first receiving means, a second bore in said body intersecting said second receiving means, said first and second bores being of circular cross section and intersecting internally of said body, a first plug in said first bore having a clamping member at one end thereof forming a part of said first dovetail receiving means, a second plug in said second bore having a clamping member at one end thereof forming a part of said second dovetail receiving means, each of said plugs and clamping members being moveable along the axis of their respective bores and rotatable about the axis of their respective bores, means rotatably and axially biasing the position of each of said clamping means about the axis of its respective bore to an open position to prevent said clamping means from blocking entry of a tool holder into the receiving means of which it forms a part, means for limiting rotational motion of said clamping means and means for simultaneously actuating both of said clamping means to an engaged position.

12. A tool post as in claim 11 wherein said first plug has a bore extending therethrough and said second plug has an extension passing through said bore, said extension having a threaded end emerging from a third side of said body, and wherein said actuating means includes a handle threadably connected to said extension for imparting axial motion to said second plug, and wherein said actuating means also includes a conical section on said second plug in engagement with a slabbed surface on said first plug to impart axial movement to said first plug upon axial movement of said second plug.

13. A tool post as in claim 12 wherein the diameter of the bore extending through said second plug is at least equal to the size of said extension plus the maximum motion of said second plug in one direction.

14. A tool post as in claim 11 wherein said first plug has a bore therein having an axis skewed with respect to the axis of said first bore and second plug has a bore therein, having an axis skewed with respect to the axis of said second bore, and wherein said rotatably biasing means includes a first spring grounded internally of said body and extending into said bore in said first plug and a second spring grounded internally of said body and extending into said bore in said second plug.

15. A tool post as in claim 14 including a sleeve in said body defining at least part of an opening through said body for passage of means for attaching said body to a machine, and wherein said first and second springs are grounded on said sleeve, said first and second springs urging said first and second plugs, respectively, to the open position upon movement of said actuating means to a disengaged position.

References Cited by the Examiner
UNITED STATES PATENTS 2,878,705   3/1959   Hirvonen _____ 82—36

FOREIGN PATENTS 862,508   3/1961   Great Britain.
490,995   2/1954   Italy.

WILLIAM W. DYER, Jr., *Primary Examiner.*

LEONIDAS VLACHOS, *Examiner.*